Figure 1:
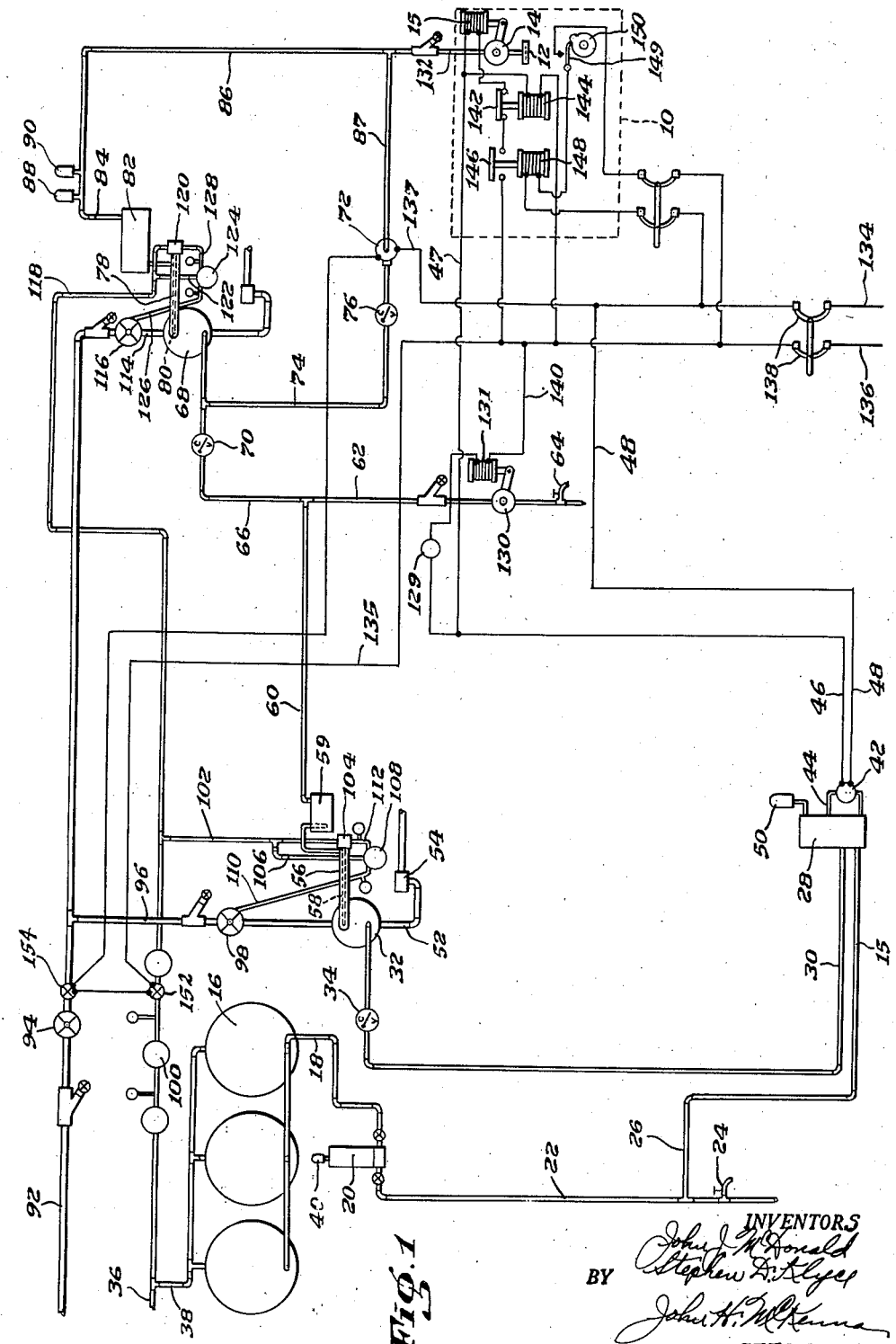

April 4, 1950

J. J. McDONALD ET AL 2,502,973

HOT WATER SYSTEM FOR RAILROAD CARS AND THE LIKE

Filed June 12, 1947

2 Sheets-Sheet 1

INVENTORS
John J. McDonald
Stephen F. Alger
BY
John H. McKenna
ATTORNEY

INVENTORS
John J. McDonald
Stephen L. Klyce
BY John H. McKenna
ATTORNEY

Patented Apr. 4, 1950

2,502,973

UNITED STATES PATENT OFFICE 2,502,973

HOT-WATER SYSTEM FOR RAILROAD CARS AND THE LIKE

John J. McDonald, Newton, and Stephen D. Klyce, Lexington, Mass., assignors to The McDonald Company, Boston, Mass., a corporation of Massachusetts Application June 12, 1947, Serial No. 754,292

17 Claims. (Cl. 126—362)

This invention relates to improvements in hot water systems. More particularly it relates to hot water systems which are especially designed and adapted for railroad cars, automotive trailers, air planes, ships and the like, where limitations of space, and weight considerations, may make it impracticable to have any sizeable hot water storage tanks and where, nevertheless, the hot water system must supply not only instantaneous hot water at temperatures ranging around 140° F., for ordinary service purposes, but desirably should supply instantaneous hot water at temperatures ranging around 190° F. for special kitchen equipment, such as dish-washing machines, and coffee dispensing apparatus, for example.

The invention is herein disclosed in its adaptation for railroad cars, which may be dining cars, grill cars, restaurant lounge cars, tavern cars, and the like, wherein kitchen facilities are provided requiring hot and cold water. The hot water for the ordinary kitchen purposes usually is supplied at temperatures ranging around 140° F. However, in certain special kitchen devices are to be employed effectively in the kitchen, hot water at considerably higher temperatures must be made available. A dish-washing machine, for example, requires for its rinse cycle hot water ranging around 190° F.

Available instantaneous hot water heaters are effectively useable for supplying hot water at the ordinary kitchen service temperatures without need for any hot water storage tank. However, so far as we are aware, all prior attempts to employ instantaneous water heaters for supplying hot water at the high temperatures required for the rinse cycle of dish-washing machines, for example, have been frustrated due to the fact that maintenance of the high temperature of the water has caused flashing with the result that mostly steam would issue from the rinse nozzles, or other hot water outlets, when they were intermittently opened. This flashing of the hot water to steam has been a natural outcome of attempts to provide instantaneous hot water at temperatures ranging around 190° F. because the water, in order to have the 190° temperature at the discharge outlets must be delivered from the heater at a substantially higher temperature. This, coupled with the fact of intermittent withdrawals at the rinse nozzles, or other outlets, has made it impracticable heretofore to have dish washers of the more efficient types in cars and other vehicles, and in ships, because of the heretofore unavoidable steam generation in the hot water system.

Hence, it is one object of the present invention to provide a hot water system which is particularly advantageous for vehicles and the like, and wherein an instantaneous hot water heater supplies hot water to spray nozzles, or other outlet means, at temperatures which are maintained at or around 190° F. without any appreciable steam discharge at the spray nozzles or other discharge outlets. The instantaneous hot water heater operates in a closed circuit which includes a relatively small conversion chamber into which the discharge from the heater delivers, so that any steam in the products discharged from the heater effectively is absorbed by the accumulation of water in the chamber which is constantly circulated in the closed circuit so long as the hot water system is in operation.

Another object is to provide a hot water system wherein one instantaneous hot water heater provides instantaneous hot water at temperatures ranging around 140° F. at one outlet and another instantaneous hot water heater supplies instantaneous hot water at temperatures ranging around 190° F. at another outlet, the latter said heater receiving water pre-heated by the first mentioned heater and being in a closed circuit which avoids said first mentioned heater, with means in said closed circuit for forced circulation of water therein through a relatively small chamber wherein any steam generated by the higher temperature heater effectively is absorbed by the body of water in said chamber.

A further object is to provide a hot water system having one fluid-pressure-controlled steam operated instantaneous hot water heater for supplying one outlet with hot water at temperatures ranging around 140° F., and having a second fluid-pressure-controlled steam operated instantaneous hot water heater for supplying another outlet with hot water at temperatures ranging around 190° F., said second heater being in a closed circuit receiving water pre-heated by the first mentioned heater, with means in the closed circuit providing forced circulation of water therein through a chamber wherein any steam generated by said second heater is delivered into and absorbed by the water in the chamber.

Yet another object is to provide a hot water system having two fluid-pressure-controlled steam operated instantaneous hot water heaters of which one is a booster heater receiving hot water pre-heated by the other heater, said other heater having associated in series with it a third heater which is independent of fluid-pressure control and is operative to heat water at times when the associated instantaneous heater is out of action as when a suitable source of fluid pressure in combination with a heating means may not be available.

Still another object is to provide a hot water system having two fluid-pressure-controlled steam operated instantaneous hot water heaters of which one supplies hot water to one service outlet at temperatures ranging around 140° F. and the other supplies hot water to another service outlet at temperatures ranging around 190° F., there being means for automatically cutting off flow to both of said service outlets in response to any failure of the water supply to a heater.

It is, moreover, a purpose and object of the invention generally to improve the efficiency and adaptability of hot water systems and especially hot water systems for railroad cars, trailers, airplanes and ships where space limitations or weight considerations make it impracticable to have hot water storage tanks.

The invention makes it possible on a train, for example, to have a single suitably large water storage tank or, preferably, a plurality of such tanks in series, which can supply the cold water needs of the train and from which water for the hot water requirements is drawn only as needed and only in amounts approximating what actually is used. In other words, the water supply is not divided among both cold water and hot water storage tanks which is important where long trips must be made without replenishing of the water supply. Also, it is a feature of extreme importance, particularly in warm weather, that the substantial heat radiation from a sizeable hot water storage supply is avoided.

Figure 2:
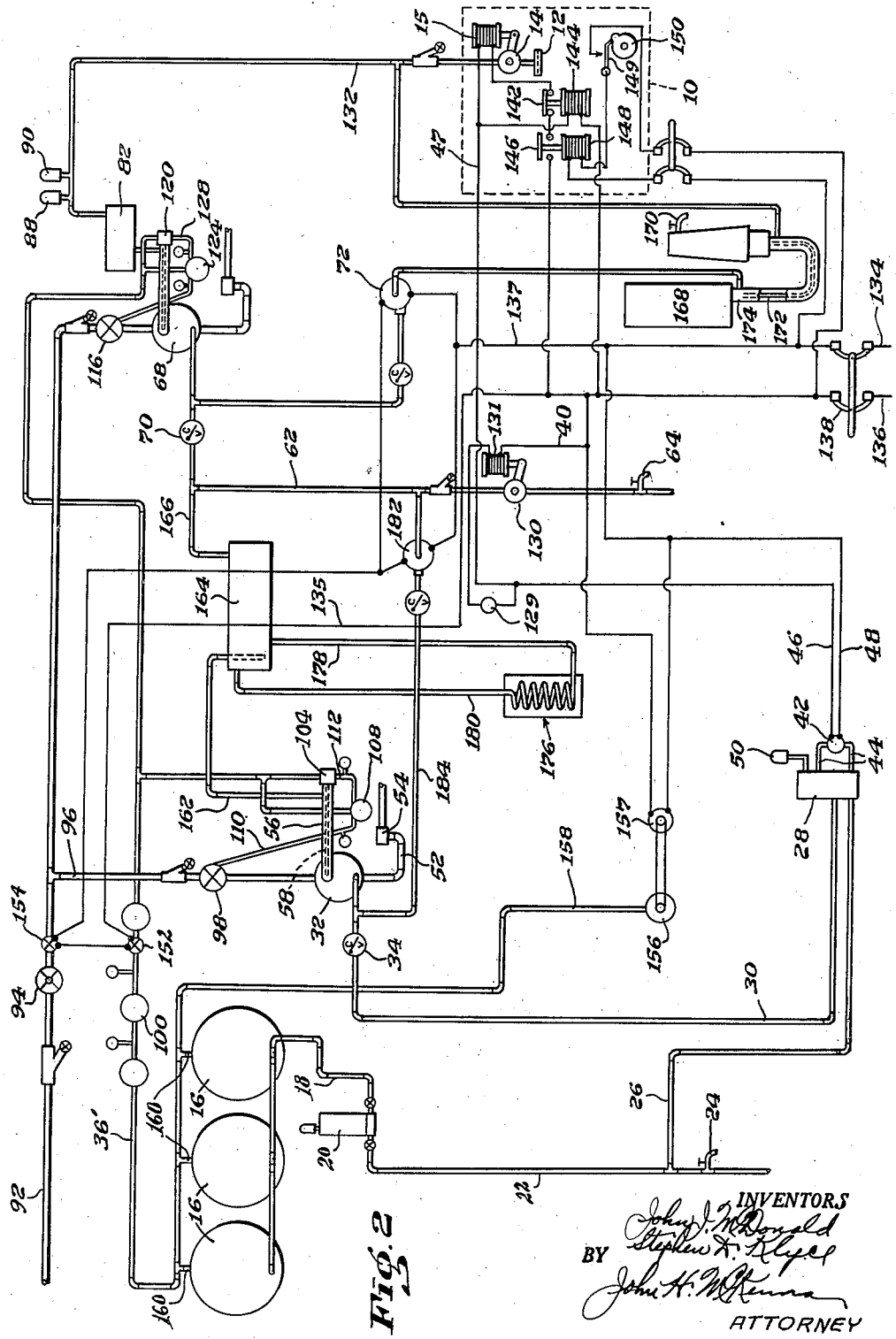

In the accompanying drawings:

Fig. 1 is a diagrammatic representation of a hot water system for a railway dining car which embodies features of the invention; and Fig. 2 is a diagrammatic representation of a modified form of system embodying the same and additional features of the invention.

Referring to the drawings, Fig. 1 is a diagrammatic representation of a hot water system particularly adapted for a railroad dining car which is equipped with a dish-washing machine indicated generally at 10. The dish-washing machine requires, for the efficient operation of its rinsing cycle, hot water at temperatures ranging around 190° F. One of the rinse sprays is indicated at 12 and the rinse control valve is indicated at 14. Operation of the rinse spray 12 occurs only at intermittent times when the rinse control valve 14 is open.

Any suitable available source of cold water may supply the hot water system. In the embodiment herein represented, three series-connected cold water storage tangs 16 are adapted to be mounted at any available location in or on the dining car, delivering through conduit 18 to a suitable filter 20 whence the cold, filtered water passes through conduit 22 to the kitchen cold water service tap 24, or the like. A branch conduit 26 conducts cold, filtered water also to the chamber 28 whence it passes through conduit 30 to the steam operated instantaneous hot water heater 32, a check valve 34 being provided in conduit 30 to prevent backflow from the heater.

In the embodiment of Fig. 1, the cold water supply is maintained under pressure by compressed air from the train air line, a tap-off from which is indicated at 36, the branch air conduit 38 leading from the tap-off conduit 36 and opening into the upper portion of each tank 16, thereby to maintain a predetermined air pressure above the water in each tank. An air vent 40 preferably is provided on the filter 20 to release any bubbles of air that may come to the filter thereby to avoid the building up of an accumulation of air in the filter which would gradually diminish the efficiency of the filter.

As previously described, the cold, filtered water going to the heater 32 first passes through the chamber 28. Chamber 28 serves to provide an artificial water level any dropping of which below a predetermined level in the chamber is utilized to operate an electrical cut-out which conditions the hot water system so that no hot water may be withdrawn therefrom until the cold water tanks have been replenished with water. To this end, a known type of low water cut-out switch is provided at 42 adjacent to the chamber 28, it being connected in a loop-conduit 44 whose lower leg opens into the chamber close to the chamber bottom and whose upper leg opens into the chamber at a suitable location along the vertical extent of the chamber. When the water level in chamber 28 is above the upper leg of the loop-conduit 44, water fills the loop-conduit and maintains the cut-out switch 42 closed across the electric circuit conductors 46, 48. But, if the water level in chamber 28 drops substantially below the upper leg of the loop-conduit 44, the cut-out switch 42 opens to interrupt a circuit, which includes conductors 46, 48, and which leads to apparatus later to be described.

The chamber 28 is equipped with a vent device 50 which is located at an upper region of the chamber in position to promote the maintenance of a water-hammer cushion of air above the water in the chamber, the vent device being of a known type which closes in response to rise of water level in the chamber and which because of its location below the top of the chamber, traps a body of air above the water for constituting the mentioned air cushion.

The heater 32 may be a known type of instantaneous hot water heater in which the water is circulated through one or more tubes interiorly of the heater casing, and steam is delivered into the heater casing in surrounding relation to the water tubes. Steam and condensate exhaust from the heater casing through conduit 52 to a suitable trap 54 whence condensate discharges to waste.

In the Fig. 1 embodiment, heated water passes from the heater 32 through the conduit 56 within which is located the thermostat 58 which controls the admission of steam to the heater in a manner later to be described. Heater 32 is controlled and adapted to deliver hot water to conduit 56 at temperatures ranging around 140° F. and this hot water passes from conduit 56 through conduits 60, 62 to the ordinary hot water service tap 64, or the like.

Preferably, a relatively small surge tank 59 is located in conduit 60 for maintaining approximately the predetermined water temperature at the service outlet 64 notwithstanding an overheating of the water which is in the heater when flow through the heater suddenly is stopped. It will be obvious that the heater will over-run a little when flow is suddenly stopped, and the water which happens to be in the heater will be elevated in temperature somewhat above the predetermined temperature. It is desirable, therefore, to mix this over-heated water with a substantial body of water of the predetermined temperature before it passes to the service outlet 64. According to the invention, the water from the heater 32 is directed into the surge tank 59 well down in the tank, mixing with the water in the tank before passing out at the top of tank 59 to conduit 60. The tank 59 needs to be only relatively small, say of two and one-half gallons capacity, and it effectively maintains approximately the predetermined temperature of the water delivered at the service outlet regardless of the customary intermittent flow conditions in the system, due to intermittent withdrawal at the service outlet 64.

According to the invention, however, the hot water from conduit 60 delivers also through a conduit 66 to a second instantaneous steam operated hot water heater 68, with a check valve 70 in conduit 66 preventing back-flow in direction from heater 68. Heater 68 may be similar to heater 32 but is controlled and adapted to boost the temperature of the approximately 140° F. water coming to it so as to provide hot water at temperatures ranging around 190° F., which involves heating the water by heater 68 close to or to the boiling temperature of the water with the accompanying problem of flashing at the heater due to the trapping of steam in the heater as a result of stopping of the flow of water through the heater.

According to the invention, flashing of water to steam at the heater 68 is reduced to a minimum, and such steam as may be generated is quickly re-converted and absorbed by the water in the super-heated hot water distributing system.

To this end, provision is made for constant forced circulation of water through the heater 68 so long as the hot water system is in use. A circulating pump 72 has its pressure or discharge side connected through conduit 74 to the conduit 66 at a location between the heater 68 and check valve 70 in conduit 66, so that the pump delivers to the heater. A check valve 76 in conduit 74 prevents back-flow toward the pump. Super-heated water, and any steam that may have been generated, passes into a conduit 78 within which is arranged a thermostat 80 which controls the operation of the heater. From conduit 78, the super-heated water and steam delivers into the bottom region of a relatively small conversion chamber 82 which, preferably, is located as close to the heater 68 as is practicably possible. Chamber 82 may be of four gallons capacity, for example, with its outlet at 84 in the top wall of the chamber and connected through conduits 86, 87 to the suction side of pump 72. Preferably, there is provided in conduit 86, adjacent to the outlet from chamber 82, a known type of air vent 88 and a known type of pressure relief valve 90.

Both of the heaters 32, 68 may be operated by steam from the same source, such as from the train steam line, a tap-off from which is indicated at 92. However, in the embodiment herein shown in Fig. 1, the usual train line steam pressure is maintained at 65 pounds minimum per square inch and desirably is reduced to 40 pounds per square inch by a known type of reducing valve 94 in the conduit 92. A steam conduit 96 leads from the reduced pressure side of tap-off conduit 92 to the heater 32, with a valve 98 in the conduit 96 for controlling admission of steam to the heater. Valve 98 may be a known type of self-closing diaphragm valve which is openable by fluid pressure to admit steam to heater 32. Fluid pressure for opening valve 98 conveniently may be air pressure from the train air line. However, the train line air pressure desirably is reduced for operating the valve 98 by means of a known type of reducing valve 100 in conduit 36. The reduced pressure air is conducted through air conduit 102 to a thermostatic valve 104 associated with the thermostat 58 and is conducted also through by-pass conduit 106 around valve 104 to a valve 108 which, when open, passes air under pressure from by-pass conduit 106 through conduit 110 to the steam control valve 98. Whenever the temperature of the water delivering from heater 32 is below a predetermined temperature, such as 140° F., the thermostatic valve 104 is closed and valve 108 is open so that air pressure is acting on steam control valve 98 holding it open. When the temperature of the delivering water reaches the predetermined temperature, thermostatic valve 104 opens to pass air under pressure through conduit 112 into the casing of valve 108 where it acts on valve 108 to close it against passage of air under pressure from by-pass conduit 106, thus permitting steam control valve 98 to close. Hence the heater 32 is automatically controlled so that water delivered to conduit 60 is maintained at a predetermined temperature which customarily will range around 140° F. for ordinary hot water service in a kitchen.

The super-heater 68 is similarly operated and controlled so that water in the conversion chamber 82 is maintained automatically at a predetermined temperature which desirably will range around 190° F. for use with special kitchen equipment, such as in the rinse cycle of the dish-washing machine 10. The heater 68 is supplied with steam through conduit 114 from the reduced pressure side of tap-off steam conduit 92, with the self-closing diaphragm valve 116 in conduit 114 controlling the admission of steam to the heater. Air under pressure is conducted through conduit 118 from the reduced pressure side of tap-off air conduit 36 to the thermostatic valve 120, and is conducted also, around valve 120, by means of by-pass conduit 122 leading to valve 124 which, when open, admits air under pressure from by-pass conduit 122 through conduit 126 to the steam control valve 116. As previously described in connection with heater 32, thermostatic valve 120 is closed until the water delivering from heater 68 is at a predetermined temperature, at which time it opens to pass air under pressure through conduit 128 for closing valve 124, thereby to permit closing of steam control valve 116.

In railway dining and grill cars, and the like, where the supply of water for both the cold and hot water systems must be carried in the cars, serious depletion and even complete exhaustion of the water supply is an ever-present possibility. According to the invention, any such serious reduction of the water supply automatically closes both the 140° F. and the 190° F. hot water systems against withdrawal of any water therefrom. In this connection, a normally closed solenoid valve 130 is provided in the 140° F. hot water conduit 62, the valve being held open only when its solenoid 131 is energized. The rinse control valve 14 of the dish-washing machine 10 is a similar normally closed solenoid valve, it being in a conduit 132 which leads from the 190° F. hot water circuit to the rinse spray 12 of the dishwashing machine.

The line wires from any convenient source of electrical energy are indicated at 134, 136 and a common type of circuit breaker is indicated at 138. Conductor 48 leads from line wire 134 to one side of the cut-out switch 42 at the chamber 28, while conductor 46 leads from the other side of cut-out switch 42 to a known type of normally closed thermal switch 129, which opens with rise of temperature, and extends thence to one side of coil 131 of solenoid valve 130. The other side of coil 131 is connected by conductor 140 to the other line wire 136, so that a circuit is completed through coil 131 to hold solenoid valve 130 open, whenever the cut-out switch 42 is closed and thermally controlled switch 129 is closed. Conductor 46 also leads, through its branch 47, to one side of the coil 15 of the solenoid valve 14, the other side of coil 15 being connected to one contact of a solenoid switch 142 whose coil 144 is connected between conductor 47 and the line wire 136, whereby the solenoid switch 142 is energized and held closed whenever the cut-off switch 42 is closed. The other contact of solenoid switch 142 is connected to one contact of the solenoid rinse-control switch 146 whose coil 148 is energized only when cam switch arm 149 is closed by the rinse control cam 150. The other contact of switch 146 is connected to the line wire 136.

Hence, so long as cut-off switch 42 at chamber 28 remains closed and thermal switch 129 is closed, the solenoid valve 130 will be held open. Also, so long as cut-off switch 42 is closed, regardless of the condition of thermal switch 129, the circuit for solenoid valve 14 will be conditioned for opening and closing of valve 14 in response to operations of the rinse control switch 146 which in turn is controlled by the cam 150. However, if cut-off switch 42 opens in response to drop of water level in chamber 28, solenoid valve 130 immediately closes, and the solenoid switch 142 opens to render the circuit of solenoid valve 14 incapable of being closed by operations of the rinse control switch 146.

As herein shown, an extension 135 of line wire 136 leads through two series-connected pressure-maintained switches 152, 154, one in air line 36 and the other in steam line 92, and thence to one side of the motor of the circulating pump 72, an extension 137 of conductor 134 being connected to its other side. So long as pressure in the air and steam lines 36 and 92 are maintained above predetermined pressure, the switches 152, 154 are maintained closed, completing a circuit through the pump motor. However, if either air or steam pressure drops below a predetermined minimum, the appropriate switch 152 or 154 will open to stop the pump until the proper pressure is restored.

It frequently happens, in the case of railway dining and grill cars, that there may be substantial periods of time when steam for operating the hot water heaters may not be available for one reason or another and yet it may be urgent that hot water shall be available in the car kitchens. For example, it may not be permissible to start the auxiliary boiler of a Deisel or electric engine within a specified area around a station or depot; or the engine may be detached from cars left standing on a siding for the convenience of skiers or other sport enthusiasts. In such cases it is necessary to supplement the regular steam-operated heating means of the car hot water system by means which can provide hot water during the interims that the steam heaters may be out of action.

Fig. 2 diagrammatically illustrates a hot water system which includes auxiliary water heating means which can effectively provide hot water notwithstanding a failure or absence of the regular steam supply.

This Fig. 2 system is generally similar to and normally operates substantially like the Fig. 1 system, excepting for the modifications and additions to be described. An air compressor 156, driven by electric motor 157, supplies air under pressure above the water in the tanks 16 through conduit 158 and branch conduits 160. Conduit 158 also supplies the air line 36'. This makes it possible to operate the system in absence of a train air line, the substituted air line 36' having reducing valve 100 and supplying air under pressure to thermostatic valve 104, valve 108 and steam control valve 98 the same as in the Fig. 1 embodiment. However, hot water delivering from heater 32 to conduit 56, in which thermostat 58 is located, passes thence through conduit 162 and is discharged into a tank 164 close to the bottom of the tank at one end thereof. An outlet conduit 166 from the top of the tank at its other end conducts hot water through the check valve 70 to the super-heater 68 whence the super-heated water circulates as in the Fig. 1 system, with the pump 72 providing forced circulation through heater 68 and through the conversion chamber 82 as previously described.

Conduit 166 from tank 164 supplies hot water also to the conduit 62 leading to the ordinary hot water service tap 64, with solenoid valve 130 in this conduit normally held open but adapted to close if there is a predetermined depletion of the water supply, as previously explained.

The super-heated water, in Fig. 2, is supplied not only to the rinse spray 12 of dish-washing machine 10, as in the Fig. 1 system, but is circulated through the distribution part of a coffee system, a coffee urn of which is represented at 168 and a dispenser outlet of which is indicated at 170. The coffee distribution part of the coffee system comprises an inner conduit 172 for conducting coffee from the urn 168 to the dispenser 170, and an outer conduit 174 within which the coffee conduit extends. The outer conduit 174 is included in the super-heated water circuit in which pump 72 operates, so that super-heated water of temperatures ranging around 190° F. is circulated in contact with the coffee conduit, thereby to maintain the coffee hot from the urn to the dispenser. In all other respects, the super-heated portion of the system of Fig. 2 may be the same as that of Fig. 1.

The other water heating and circulating part of the system of Fig. 2 differs from the system of Fig. 1 in that the water back of a kitchen range is included in the circulation system, it being indicated generally at 176. One end of the water back coil is connected through conduit 178 into the bottom region of the tank 164 and the other end of the coil is connected through conduit 180 into an upper region of tank 164, so that, when the range is in operation, there is a circulation of water through the water back coil and this water is heated in the water back and, in the absence of other means of heating water delivered to tank 164, can maintain the water in the tank at temperatures ranging around 140° F.

Also, in the Fig. 2 system, a pump 182 provides forced circulation of water through the steam water heater 32 so long as steam is available for operating the heater. The pump 182 is located in a conduit 184 which connects conduit 62 with conduit 30 on the heater side of check valve 34. Pump 182 is connected in parallel with pump 72 in the electrical circuit heretofore described, and it operates so long as circuit breaker 138 is closed and steam and air pressures in steam and air lines 92, 36' are sufficient to maintain pressure switches 152, 154 closed. When the steam pressure in steam line 92 fails for any reason, both circulating pumps 72 and 182 stop, and heating of the water is then taken over by the water back 176 which can maintain a supply of hot water to the tap 64 at temperatures sufficiently high for ordinary kitchen purposes. When steam is again available, the heater 32 resumes operation and the water back circuit, being in parallel with the forced circulation circuit, continues in operation but has little advantage while the more efficient steam operated heater is in action. Water will by-pass the water back 176, when pump 182 is operating, and a minimum of heat will be extracted from the range during the forced circulation operation of the system.

It will be apparent from the foregoing description, in connection with the drawings, that the invention provides a hot water system which effectively meets the demands peculiar to dining and grill car hot water systems and other systems where limitations of space and weight considerations make it impracticable to have any sizeable hot water storage tanks. The invention solves the heretofore troublesome problem of minimizing steam generation in the intermittent instantaneous super-heating of water and of effectively avoiding any deleterious effects from such steam as may be generated. Also, the invention provides a hot water system for cars and the like which assures a supply of hot water for ordinary kitchen purposes notwithstanding that steam from the train steam line may not be available for normal heating of water in the system.

We claim as our invention:

1. In a hot water system for transitory kitchens and the like, means for holding a supply of cold water, an instantaneous water heater receiving cold water from said supply and delivering hot water at temperatures within the range of 130° F. to 160° F., a second instantaneous water heater receiving hot water delivered from the first heater and delivering hot water at temperatures ranging around the boiling temperature but never substantially exceeding the boiling temperature, a closed water circuit including said second heater and avoiding said first heater, said closed circuit having water-holding capacity too small for substantial storage of water therein, means for forced circulation of water in said closed circuit and through said second heater, means for withdrawing hot water from the system at temperatures approximating the temperatures at which water is delivered from said first heater, and means for withdrawing hot water from said closed circuit at temperatures approximating one hundred ninety degrees Fahrenheit.

2. In a hot water system for transitory kitchens and the like, means for holding a supply of cold water, an instantaneous water heater receiving cold water from said supply and delivering hot water at temperatures within the range of 130° F. to 160° F., a second instantaneous water heater receiving hot water delivered from the first heater and delivering hot water at temperatures ranging around the boiling temperature but never substantially exceeding the boiling temperature, a closed water circuit including said second heater and avoiding said first heater, said closed circuit having water-holding capacity too small for substantial storage of water therein, means for forced circulation of water in said closed circuit and through said second heater, means in said closed circuit on the delivery side of said second heater providing a circuit region of increased cross-section whereby said region accommodates a substantial body of water, said region of increased cross-section being of sufficient size to operate effectively as a steam-absorbing means yet too small to serve as a means for substantial storage of water, means for delivering the output of said second heater into said substantial body of water thereby to dissipate any steam in said heater output by absorption thereof by said water, and means for withdrawing hot water from said closed circuit beyond said region of increased cross-sectional area.

3. In a hot water system for transitory kitchens and the like, means for holding a supply of cold water, an instantaneous water heater receiving cold water from said supply and delivering hot water at temperatures within the range of 130° F. to 160° F., a closed water circuit receiving hot water delivered from said heater, said closed circuit having water-holding capacity too small for substantial storage of water therein, a second instantaneous water heater in said closed circuit, means for forced circulation of water in said closed circuit and through said second heater, said second heater being adapted to heat water passing therethrough to temperatures ranging around the boiling temperature but never substantially exceeding the boiling temperature, and means in said closed circuit and close to the delivery side of said second heater for dissipating any steam delivered from the heater, the latter said means being of sufficient size to operate effectively yet too small to serve as a means for substantial storage of water, and means beyond said dissipating means for withdrawing hot water from said closed circuit.

4. In a hot water system for transitory kitchens and the like, means for holding a supply of cold water, an instantaneous water heater receiving cold water from said supply and delivering hot water at temperatures within the range of 130° F. to 160° F., a closed water circuit receiving hot water delivered from said heater, said closed circuit having water-holding capacity too small for substantial storage of water therein, a second instantaneous water heater in said closed circuit adapted to heat water passing therethrough to temperatures ranging around the boiling temperature but never substantially exceeding the boiling temperature, means for forced circulation of water in said closed circuit and through said second heater at a rate to minimize flashing of water to steam at the heater, a chamber in said closed circuit receiving the output of said second heater, said chamber having an accumulation of water therein and being of sufficient size to operate effectively as a steam absorbing means yet too small to serve as a means for substantial storage of water, and said heater output being delivered into the midst of said accumulation of water, whereby any steam in said heater output is absorbed by said water, and means beyond said chamber for withdrawal of high temperature hot water from said closed circuit.

5. In a hot water system for transitory kitchens and the like, means for holding a supply of cold water, an instantaneous steam water heater receiving cold water from said supply and delivering hot water at temperatures within the range of 130° F. to 160° F., temperature responsive means at the delivering side of the heater controlling operation of the heater, a closed water circuit receiving hot water delivered from said heater, said closed circuit having water-holding capacity too small for substantial storage of water therein, a second instantaneous steam water heater in said closed circuit and adapted to heat water passing therethrough to temperatures ranging around the boiling temperature but never substantially exceeding the boiling temperature, temperature responsive means at the delivery side of said second heater for controlling the operation of said second heater, means for forced circulation of water in said closed circuit and through said second heater at a rate to minimize flashing of water to steam at the heater, means at the delivery side of said second heater for absorbing any steam that may deliver from the heater, means for withdrawal of hot water from the system at a location between the first mentioned heater and said closed circuit, and means for withdrawing higher temperature water from said closed circuit.

6. In a hot water system for transitory kitchens and the like, means for holding a supply of cold water, an instantaneous water heater receiving cold water from said supply and delivering hot water at temperatures within the range of 130° F. to 160° F., temperature responsive means at the delivery side of the heater controlling operation of the heater, a closed water circuit receiving hot water delivered from said heater, a second instantaneous water heater in said closed circuit and adapted to heat water passing therethrough to temperatures ranging around the boiling temperature but never substantially exceeding the boiling temperature, temperature responsive means at the delivery side of said second heater for controlling the operation of said second heater, said closed circuit having water-holding capacity too small for substantial storage of water therein, means for forced circulation of water in said closed circuit and through said second heater at a rate to minimize flashing of water to steam at the heater, means at the delivery side of second heater for absorbing any steam that may deliver from the heater, means for withdrawal of hot water from the system at a location between the first mentioned heater and said closed circuit, means for withdrawing higher temperature water from said closed circuit, and means associated with each said withdrawal means for preventing withdrawal in response to a predetermined depletion of said cold water supply.

7. In a hot water system for transitory kitchens and the like, means for holding a supply of cold water, water heating means receiving water from said supply and adapted to deliver hot water to said system at temperatures maintained within a temperature range of 130° F. to 160° F., means for withdrawal from the system of hot water at said predetermined temperatures, a second water heating means receiving hot water delivered by the first mentioned heater and adapted to deliver water to said system at temperatures ranging around the boiling temperature but never substantially exceeding the boiling temperature, means preventing flow of the higher temperature water to said withdrawal means, means for withdrawal from the system of said higher temperature hot water, and means providing for water-absorption of any steam which may be generated at said second heater prior to its reaching the latter said withdrawal means, the hot water portion of said system having water-holding capacity too small for substantial storage of hot water therein.

8. In a hot water system for transitory kitchens and the like, means for holding a supply of cold water, a steam water heater receiving water from said supply and adapted to deliver hot water at temperatures ranging around one hundred forty degrees Fahrenheit, means for withdrawing hot water from the system at approximately said temperatures, a second steam water heater receiving hot water delivered from the first mentioned heater and adapted to deliver hot water at temperatures ranging around the boiling temperature but never substantially exceeding the boiling temperature, means for withdrawing hot water from the system at temperatures approximating one hundred ninety degrees Fahrenheit, and a kitchen range water jacket constantly connected in parallel with the first mentioned heater for continued heating of water both when the first mentioned heater is operating and when the first mentioned heater is out of service, said system, on the delivery side of said second steam water heater, having water-holding capacity too small for substantial storage of hot water.

9. In a hot water system for railway car kitchens, means for holding a supply of cold water, an instantaneous steam water heater receiving cold water from said supply and delivering hot water to one portion of said system, temperature-responsive means for starting said heater intermittently to maintain the water in said one portion of the system at a temperature approximating one hundred forty degrees Fahrenheit, means for withdrawing hot water from said one portion of the system, a closed water circuit receiving hot water from said one portion of the system, an instantaneous steam water heater in said closed circuit, temperature-responsive means for starting the latter said heater intermittently to maintain the water in said closed circuit at a temperature approximating one hundred ninety degrees Fahrenheit, said closed circuit having water-holding capacity too small for substantial storage of water therein, means for forced circulation of water in said closed circuit and through said heater therein at a rate to minimize flashing of water to steam at said heater, means at the delivery side of the heater in said closed circuit providing for water-absorption of any steam delivered from said heater, and means for withdrawing hot water from said closed circuit.

10. In a hot water system for railway car kitchens, means for holding a supply of cold water, water-heating means receiving cold water from said supply and maintaining the water in one portion of the system at approximately one hundred forty degrees Fahrenheit, means for withdrawing hot water from said one portion of the system, a second water heating means receiving hot water from said one portion of the system and maintaining water in another portion of the system at approximately one hundred ninety degrees Fahrenheit, means in the higher temperature portion of the system for dissipating steam generated at said second heater, means for withdrawal of hot water from the higher temperature portion of the system, and means associated with each said withdrawal means for preventing any withdrawal from the system in response to a predetermined depletion of said cold water supply, said higher temperature portion of the system having water-holding capacity too small for substantial storage of hot water therein.

11. In a hot water system for railway car kitchens, means for holding a supply of cold water, water-heating means receiving cold water from said supply and maintaining the water in one portion of the system at approximately one hundred forty degrees Fahrenheit, means for withdrawing hot water from said one portion of the system, a second water heating means receiving hot water from said one portion of the system and maintaining water in another portion of the system at approximately one hundred ninety degrees Fahrenheit, the higher temperature portion of the system having water-holding capacity too small for substantial storage of hot water therein, means in the higher temperature portion of the system for dissipating steam generated at said second heater, means for withdrawal of hot water from the higher temperature portion of the system, a chamber between the cold water supply and the first mentioned heating means, said chamber providing an artificial supply water level, and means responsive to a predetermined drop of the water level in said chamber for preventing any withdrawal of hot water from the system at either of said withdrawal means.

12. In a hot water system for railway car kitchens, means for holding a supply of cold water, an instantaneous steam water heater receiving cold water from said supply, and delivering hot water to one portion of said system, temperature-responsive means for starting said heater intermittently to maintain the water in said one portion of the system at a temperature approximating one hundred forty degrees Fahrenheit, a kitchen range having a water jacket constantly connected in said one portion of the system in parallel with the said steam water heater and adapted to heat water in said one portion of the system when said range is operating and adapted to continue heating the water in said one portion of the system at times when said steam water heater is operating and at times when said steam water heater is out of service, means for withdrawing hot water from said one portion of the system, a closed water circuit receiving hot water from said one portion of the system, an instantaneous steam water heater in said closed circuit, temperature-responsive means for operating the latter said heater intermittently to maintain the water in said closed circuit at a temperature approximating one hundred ninety degrees Fahrenheit, means in said closed circuit for minimizing flashing of water to steam at said heater therein, additional means in said closed circuit promoting absorption of any steam delivered from the heater in said closed circuit, and means for withdrawal of hot water from said closed circuit, said closed water circuit having water-holding capacity too small for substantial storage of water therein.

13. In a hot water system for railway car kitchens, means for holding a supply of cold water, a closed water circuit receiving cold water from said supply and including a chamber for holding a substantial body of water, an instantaneous steam water heater in said closed circuit, temperature-responsive means for starting said steam water heater intermittently to maintain water in said closed circuit at approximately one hundred forty degrees Fahrenheit, a second closed water circuit including said chamber, means independent of steam for heating water in said second closed circuit and promoting circulation of water in said second closed circuit and through said chamber, means for forced circulation of water in the first mentioned closed circuit and through said steam water heater and said chamber, means for supplying steam to said steam water heater, and means for stopping said forced circulation in response to a failure of said steam supply, the said circulation in said second closed circuit continuing regardless of said steam supply.

14. In a hot water system for railway car kitchens, means for holding a supply of cold water, a closed water circuit receiving cold water from said supply, an instantaneous steam water heater in said closed circuit, temperature-responsive means controlling the operation of said heater to maintain the water in said closed circuit at temperatures ranging around one hundred forty degrees Fahrenheit, means for withdrawing hot water from said closed circuit, a second closed water circuit receiving hot water from the first mentioned closed circuit, an instantaneous steam water heater in the second closed circuit, temperature-responsive means controlling the operation of said heater in the second closed circuit for maintaining the water in the latter said circuit at temperatures ranging around one hundred ninety degrees Fahrenheit, means for withdrawing hot water from said second closed circuit, a third closed water circuit in parallel with the first mentioned closed circuit, each of said parallel closed circuits including a common water storage chamber, means independent of steam for heating water in said third closed circuit and promoting circulation thereof through said chamber, means for supplying steam to both of said steam water heaters, and means responsive to a failure of said steam supply for stopping circulation through said steam water heaters, the circulation of hot water in said third closed circuit continuing in absence of the steam supply.

15. In a hot water system, means for heating water to a temperature within the range of 130° F. to 160° F., a second heater for boosting the temperature of water coming to it from the first mentioned heating means to a temperature relatively close to its boiling temperature but never substantially exceeding its boiling temperature, a chamber adjacent to the booster heater for holding a relatively small supply of the higher temperature water, and means for forced circulation of the higher temperature water through the booster heater and through said chamber to minimize flashing of water to steam at the booster heater and to eliminate such steam as nevertheless may be generated at the heater, said relatively small supply of water in said chamber absorbing any such steam as the output of the heater passes through said chamber, the hot water portion of said system having water-holding capacity too small for substantial storage of hot water therein.

16. In a hot water system, first and second stage heaters connected in series of which at least the second stage heater is an instantaneous water heater which receives hot water from the first stage heater and boosts the temperature thereof to temperatures at which there is a possibility of water flashing to steam at said second stage booster heater, a service conduit for withdrawing from the system relatively low temperature hot water which has been heated only by the first stage heater, means for forced circulation of hot water in a closed circuit which includes the second stage heater and excludes the first stage heater and said service conduit, a service conduit for withdrawing relatively high temperature hot water from said closed circuit, and means in said closed circuit, between the second stage heater and the latter said service conduit, for absorbing any steam which may be delivered thereto, said closed circuit having water-holding capacity too small for substantial storage of water therein.

17. In a hot water system, first and second stage heaters connected in series of which at least the second stage heater is an instantaneous water heater which receives hot water from the first stage heater and boosts the temperature thereof to temperatures at which there is a possibility of water flashing to steam at said second stage booster heater, cold water supply means for the first stage heater, a service conduit for withdrawing from the system relatively low temperature hot water which has been heated only by the first stage heater, means for forced circulation of hot water in a closed circuit which includes the second stage heater and which excludes the first stage heater and said service conduit, said closed circuit having water-holding capacity too small for substantial storage of water therein, a service conduit for withdrawing from said closed circuit relatively high temperature hot water, and means in each said service conduit adapted to close said service conduits in response to a predetermined diminution of said cold water supply.

JOHN J. McDONALD.
STEPHEN D. KLYCE.

REFERENCES CITED

The following references are of record in the file of this patent:

UNITED STATES PATENTS

| Number | Name | Date |
|---|---|---|
| 821,939 | Harris | May 29, 1906 |
| 1,790,357 | Stack | Jan. 27, 1931 |
| 1,946,676 | Eaton | Feb. 13, 1934 |
| 1,993,832 | Durdin | Mar. 12, 1935 |
| 2,224,240 | Van Vulpen et al. | Dec. 10, 1940 |
| 2,266,193 | Grutzner | Dec. 16, 1941 |
| 2,291,023 | Burklin | July 28, 1942 |